Jan. 9, 1962 N. F. MITTELSTADT ET AL 3,015,849
SHORT-STROKE PRESS
Filed June 8, 1959 3 Sheets-Sheet 2

INVENTORS.
NORBERT F. MITTELSTADT
BY WILLIAM P. PILZ JR.

Andrus & Starke
Attorneys

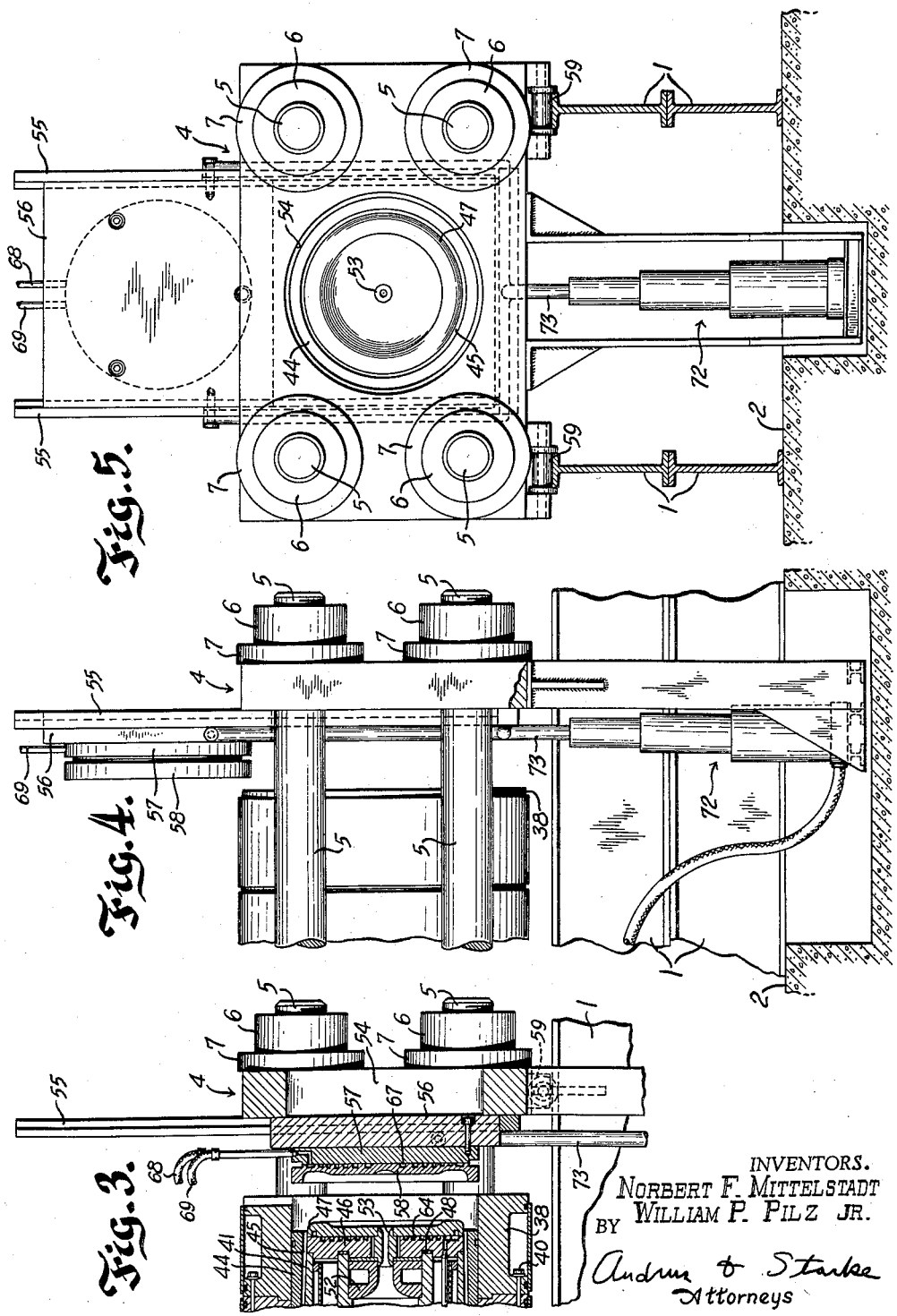

United States Patent Office 3,015,849
Patented Jan. 9, 1962

3,015,849
SHORT-STROKE PRESS
Norbert F. Mittelstadt and William P. Pilz, Jr., Sheboygan, Wis., assignors to Plymouth Die Mold, Inc., Sheboygan, Wis., a corporation of Wisconsin
Filed June 8, 1959, Ser. No. 818,959
1 Claim. (Cl. 18—30)

This invention relates to a short-stroke press, and more particularly to an injection molding press in which the clamping stroke is only a fraction of the mold length.

Previous injection molding presses have included a fixed or pressure platen and a movable platen, the latter having been actuated by hydraulic or other means to close a mold during the injection operation. Such presses were considered adequate when the forms being molded were of relatively short length, since the finished article could be removed from the mold by a relatively short opening movement of the movable platen.

In recent years, plastics such as polyethylene have been developed which have been found highly desirable in many larger forms. To mention only a few, waste baskets and garbage cans molded from plastic compounds are in great demand.

The injection molding of such larger articles has led to numerous problems of manufacture. One of these has been the resultant size and length of conventional presses necessary for production of the articles. Heretofore, the finished articles could only be removed from the press by extending the movable platen outwardly a distance at least as great as the length of the article. That is, the clamping stroke was a function of the mold length and no means had been previously found to reduce it without simultaneously limiting the length of the article to be molded.

In addition, larger molds have required greater clamping pressures during injection molding to eliminate flash. Previous increases in pressure have been obtained by increasing the diameter of the clamping piston. This has created clumsy and expensive apparatus.

The present invention solves the aforementioned problems and is based on a novel concept of press design. The clamping stroke is freed from its dependence on the mold length by the use of a laterally movable end gate for the mold and an open movable platen through which the molded article can be removed. The fluid clamping pressure is magnified by the use of multiple pistons of relatively small diameter coacting in a common cylinder.

The accompanying drawings illustrate the best mode presently contemplated by the inventors for carrying out the invention.

In the drawings:

FIG. 3 is a fragmentary section of the mold end of the press and showing the clamping platen released;

FIG. 4 is a side elevation of the structure shown in FIG. 3 and showing the end gate raised for removal of a molded article; and FIG. 5 is a right end view of the press with the end gate raised.

Figure 1:
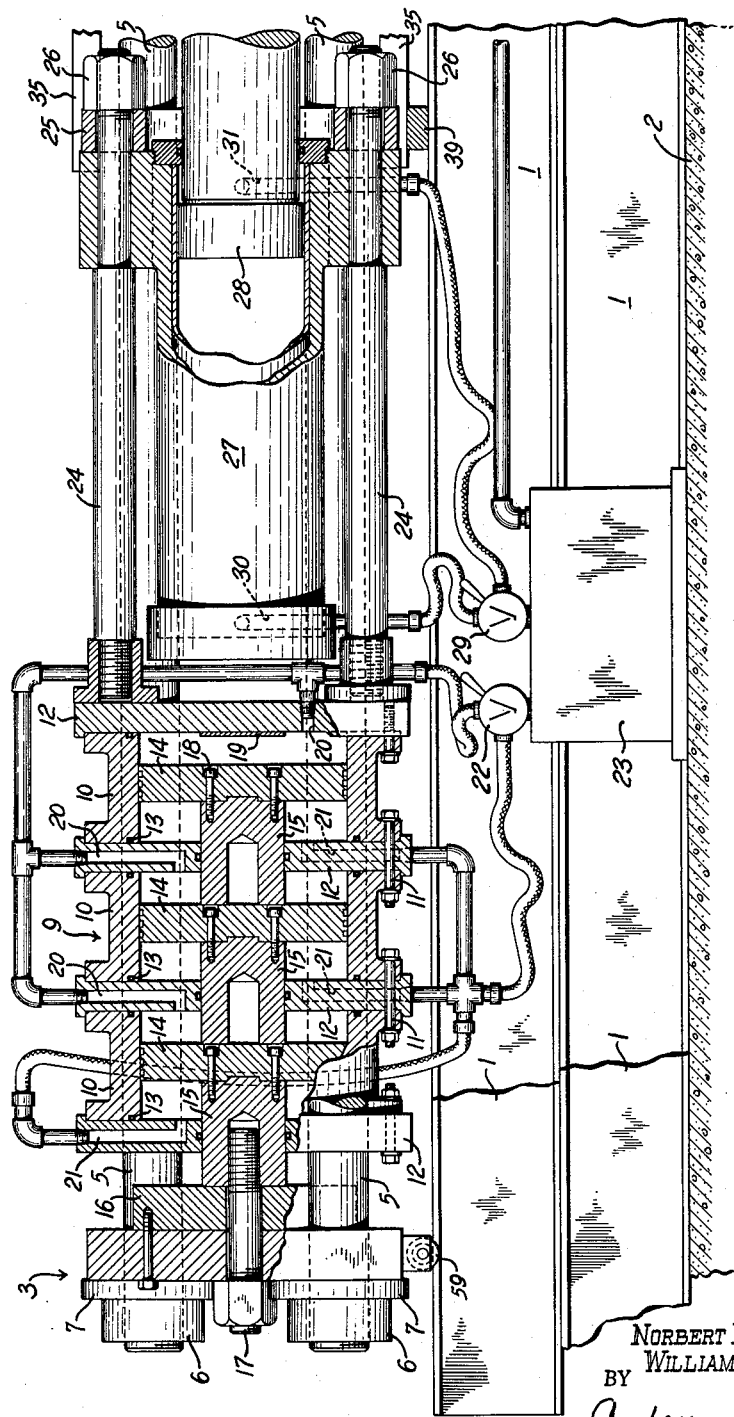
FIG. 1 is a side elevation, with parts broken away and in section, of the left or clamping cylinder end portion of a press constructed in accordance with the invention.

As shown in the drawings, the press is adapted to be supported on rails 1, mounted on a suitable foundation 2, and generally comprises a pressure platen 3 and a clamping platen 4, joined by a plurality of horizontal tie bars 5, which extend therebetween. Tie bars 5 extend through both platens, and the latter are firmly anchored to the bars by suitable nuts 6 and clamp rings 7. Tie bars 5 may be constructed in short lengths joined by suitable couplings 8.

Pressure platen 3 is disposed adjacent a clamping cylinder, indicated generally at 9, and comprising a plurality of cylinder sections 10, operable in tandem and sealably joined by bolts 11 to rectangular connector plates 12. Suitable O-ring type gaskets 13 are disposed between the ends of sections 10 and connector plates 12 to prevent leakage of hydraulic fluid. Plates 12 are supported on tie bars 5.

Each isolated cylinder chamber is provided with a piston 14, with the pistons being fixedly connected by spacers 15 which extend through connector plates 12. The leftmost spacer 15 extends through leftmost connector 12 and engages a stop plate 16 mounted on the inner face of platen 3. The entire piston assembly is connected to platen 3 by an anchor bolt 17 which extends inwardly through the platen 3 and plate 16 and is threaded into leftmost spacer 15.

Righthand piston 14 is secured to rightmost spacer 15 by bolts 18, and a second abutment or stop plate 19 is secured to the inner face of rightmost connector 12.

Hydraulic fluid is provided to each of the cylinder sections by a pair of passageways 20 and 21 in plates 12, with the passageways leading to the chambers at the left and right of the connectors, respectively. A control valve 22 of any well-known type is actuatable to supply passageways 20 and 21 with fluid from a suitable source 23, to thereby actuate pistons 14.

Figure 2:
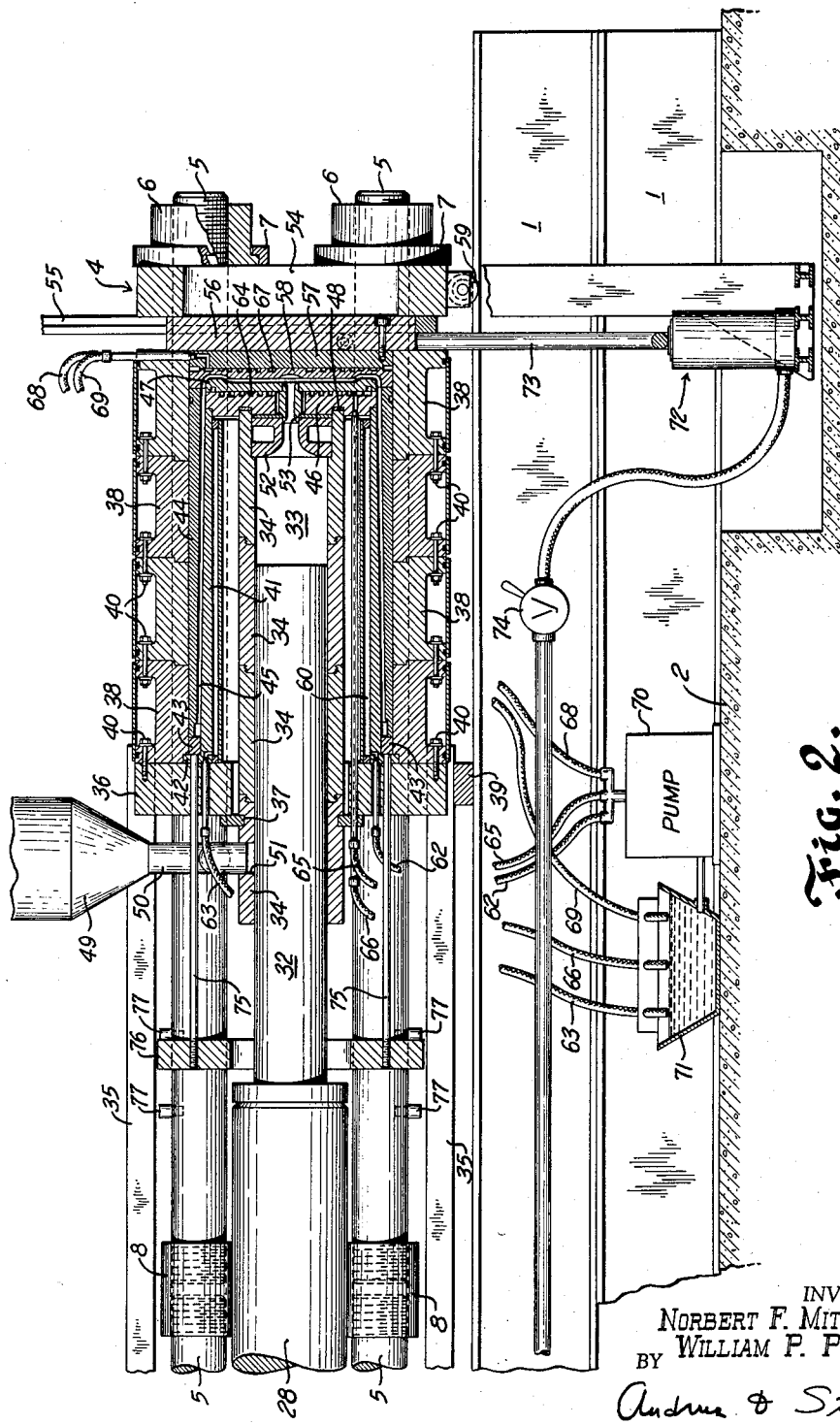
FIG. 2 is a view similar to FIG. 1 of the right or mold end of the press.

A plurality of rods 24 are secured to the right end of cylinder 9, and extend longitudinally to the right and serve as the support for a vertically disposed rectangular plate 25 which is secured thereto by nuts 26. Plate 25 serves as the mounting for a horizontal injection cylinder 27 having a piston 28 slidable therein. Cylinder 27 is flanged outwardly at its mounting to plate 25, and tie bars 5 pass therethrough. Piston 28 is selectively actuatable in the forward or reverse direction by a valve 29 which supplies fluid from source 23 to passages 30 and 31 in the cylinder. Piston 28 is provided with a ram 32 (FIG. 2) which extends forwardly of injection cylinder 27 and into an axially disposed injector tunnel 33 formed of a plurality of ring-like sections 34.

A plurality of tie bars 35 are secured to and extend forwardly from mounting plate 25 and terminate in connecting engagement with a laterally extending mold support ring 36. Ring 36 is provided with a central opening for receiving one of the sections 34 therethrough to support the rearward portion of tunnel 33, and is mounted for support on tie bars 5. The said one section 34 is spaced from the walls of said opening by a retainer ring 37.

Plate 25 and ring 36 are fixedly mounted to rails 1 by transversely extending cross-beams 39.

The mold cavity is formed of a desired plurality of mold sections 38 which are secured together and to ring 36 by bolts 40. The cavity has disposed therewithin a longitudinally extending die or core tube 41 which is fixedly secured to ring 36. Tube 41 is spaced radially inwardly of the inner walls of mold sections 38, and is provided with an outwardly extending annular flange 42 adjacent its inner end, the latter serving as an inner stop support for a stripper ring 43, to be described.

A die shell tube 44 is disposed between core tube 41 and sections 38 during molding. Shell tube 44 is initially inserted in the mold cavity from the outer, or right end thereof, and is thus slideable therewithin. When tube 44 is fully inserted, the inner end thereof bears against stripper ring 43, and the inner surface of tube 44 is spaced from the outer surface of tube 41 to provide a mold space 45 to receive the molding material.

The outer end of tube 41 is closed by a core block 46 which is molded or otherwise secured to the tube and which is contoured on its end portion 47 to merge with the inner wall of space 45.

The end of forward tunnel section 34 is supported in a groove in the inner face of core block 46, with a sealing ring 48 being dispersed in the groove.

Material for molding is supplied to the mold from a suitable source, shown schematically at 49, through a conduit 50 to an inlet 51 in one of the tunnel sections 34. Inlet 51 communicates with tunnel 33 for entry of material ahead of ram 32. A nozzle 52 is secured within the forward section 34, and communicates through a tube 53 in core block 46 to the outer face of the latter.

Clamping platen 4 is provided with an unobstructed opening 54 which is at least as large in lateral extent as the mold cavity formed by sections 38.

The inner vertical face of platen 4 is provided with a plurality of track members 55 which extend upwardly from the platen distance at least equal to the diameter of the mold cavity. Tracks 55 serve as mounts for the closed end gate 56, which is in engagement with the inner face of platen 4 during molding. A filler plate 57 is fixedly attached to end gate 56 and provides the mounting support for the end mold member 58, the latter being designed to fit within the rightmost section 38 to close the mold during injection of material.

The apparatus functions as follows: With end gate 56 in its lowered position adjacent platen 4, and a suitable mold member 58 secured to plate 57, valve 22 is actuated to supply hydraulic fluid to the chambers to the right of pistons 14. Since cylinder 9 is fixed to rails 1 by braces 39, pistons 14 will move to the left and thereby carry pressure platen 3 and clamping platen 4 leftwardly so that mold member 58 enters the mold and engages the outer end of shell tube 44. Shifting of the platen is facilitated by rollers 59 which move on track 1.

When platen 4 is clamped tight by the hydraulic pressure, molding material is forced through inlet 51 into tunnel 33, ram 32 is actuated by valve 29 and the material in the tunnel is injected through nozzle 52 and tube 53 into the mold space 45.

It is desirable to eliminate the formation of flash on the molded article which becomes more of a problem as the mold area increases. The use of relatively high clamping pressures assists in this regard. The higher pressures are obtained by the utilization of multiple pistons 14 connected in series. Since the total pressure exerted by platen 4 is directly a function of the piston area, and since the piston area has been increased substantially by using multiple pistons in series, the final pressure is relatively high. The total clamping force is higher than the force incident on any one piston 14, and regardless of the pressure obtained from source 23.

The material to be molded is introduced into the mold in a hot, molten condition, and must be cooled upon filling space 45 so that it will take the permanent shape desired. For this purpose, core tube 41 is provided with an annular chamber 60 having an inlet passage 62 and outlet passage 63 for circulation of cold water or other cooling media therethrough. Similarly, core block 46 is provided with an internal chamber 64 and an inlet passage 65 and outlet passage 66 for circulation of cooling media. In addition, end mold member 58 has a similar chamber 67 having an inlet passage 68 and outlet passage 69.

Inlet passages 62, 65, and 68, are connected through suitable conduits to a pump 70 connected to a suitable source of cooling fluid, shown as a sump 71. Outlet passages 63, 66, and 69 communicate directly with sump 71.

Once the molded piece is cooled, it is ready to be removed from the press. Ram 32 is retracted to its initial position, and valve 22 is reversed to supply hydraulic fluid under pressure to the left of pistons 14 to move platens 3 and 4 rightwardly.

Previously, the stroke of the clamping platen had to be a function of the length of the mold. The clamping platen had to be movable to a position spaced from the end of the mold at least equal to the length of the molded article, so that the latter could be removed between the end of the mold and the platen. This required additional supports and a large amount of hydraulic fluid, as well as lengthy cycle time.

The present invention frees the length of clamping and unclamping stroke from any dependence on the mold length in the following manner. Upon opening of platen 4, end mold member 58 is spaced outwardly of the end of mold sections 38, as shown in FIG. 3. End gate 56 is then lifted upwardly on tracks 55, carrying with it filler plate 57 and member 58. Any suitable mechanism may be utilized to shift gate 56 laterally on tracks 55, that shown being a hydraulic lift 72 having a pair of arms 73 disposed outwardly of the mold opening. Lift 72 may be actuated by a suitable valve 74 connected to source 23.

When end gate 56 is at its uppermost position, shown in FIGS. 4 and 5, the mold cavity is unobstructed thereby, and the mold opening and platen opening are exposed to each other.

The molded article is then forced off core 41 by a knockout mechanism which includes the stripper ring 43. Ring 43 is shown as being connected to a plurality of rearwardly extending stripper rods 75 which extend through ring 36 and are anchored at their rear ends to a lateral knockout plate 76. Plate 76 is mounted on tie bars 5 between spaced stops 77, and is adapted to be moved by stops 77 upon shifting of the tie bars.

When platens 3 and 4 move rightwardly, rear stops 77 will push plate 76 and thus ring 43 to the right, thereby forcing the molded piece and shell tube 44 partially or completely out of the mold cavity. The longitudinal spacing between pairs of stops 77 is such as to provide a lost motion effect, so that platen 4 can move outwardly slightly farther than the molded article.

Once end gate 56 has been removed, opening 54 permits manual or mechanical removal of the article and shell 44 longitudinally through platen 4. The opening stroke of the platen need therefore be only sufficient to remove the end gate and member 58 from the mold, and is substantially less than the depth of the mold from the mold opening.

Various modes of carrying out the invention are contemplated as being within the scope of the following claim, particularly pointing out and distinctly claiming the subject matter which is regarded as the invention.

We claim:

Molding apparatus comprising, a pressure platen, a clamping platen, a plurality of longitudinally extending tie bars fixedly connecting said platens for simultaneous movement, a multi-chambered cylinder supported on said tie bars adjacent said pressure platen, a piston disposed in each chamber of said cylinder with the respective pistons being connected to each other in series and with the series of pistons being connected to said pressure platen, a longitudinally extending mold mounted freely on said tie bars and with said mold having an end open toward said clamping platen, means freely mounted on said tie bars and connected to the inner end of said cylinder for introducing molding material into said mold, said clamping platen having an opening extending therethrough which is at least as large in lateral extent as said mold, a mold closure member mounted on said clamping platen and normally disposed between the open end of said mold and said clamping platen, means for introducing fluid into the chambers of said cylinder selectively on one or the other side of said pistons so that said tie bars will move said clamping platen and said mold closure member toward or away from the open end of said mold to close the latter for molding or to open the latter for unloading, the stroke of said pistons being substantially less than the depth of the mold, a knockout ring disposed adjacent the inner closed end of the mold for pushing the molded article out of the mold when the clamping platen unclamps, a plate connected to said ring and disposed inwardly of the mold, a plurality of pins mounted on said tie bars on each side of said plate, said pins being longitudinally spaced by more than the thickness of said plate to provide a lost motion delay in removing the molded article upon opening of the mold, a plurality of laterally extending tracks secured to said clamping platen so that the said platen opening is unobstructed and with said track members mounting said mold closure member for lateral movement thereon, and means for moving said mold closure member on said tracks and away from said platen opening when the mold is open so that the molded article may be removed longitudinally through the said platen opening.

References Cited in the file of this patent

UNITED STATES PATENTS

| | | |
|---|---|---|
| 452,743 | Archibald et al. | May 19, 1891 |
| 1,800,849 | Stacy | Apr. 14, 1931 |
| 1,822,939 | Stout | Sept. 15, 1931 |
| 1,952,241 | Eckert | Mar. 27, 1934 |
| 2,317,763 | Hall | Apr. 27, 1943 |
| 2,371,195 | Strauss | Mar. 13, 1945 |
| 2,377,393 | Wiley | June 5, 1945 |
| 2,447,129 | Lorant | Aug. 17, 1948 |
| 2,566,293 | Robinson | Aug. 28, 1951 |
| 2,753,847 | Reynolds | July 10, 1956 |
| 2,860,374 | Harrison et al. | Nov. 18, 1958 |

FOREIGN PATENTS

| | | |
|---|---|---|
| 225,643 | Switzerland | May 17, 1943 |